Dec. 21, 1954  F. KREIS  2,697,501
INFLUENCEABLE CENTRIFUGAL CLUTCH
Filed Dec. 3, 1951
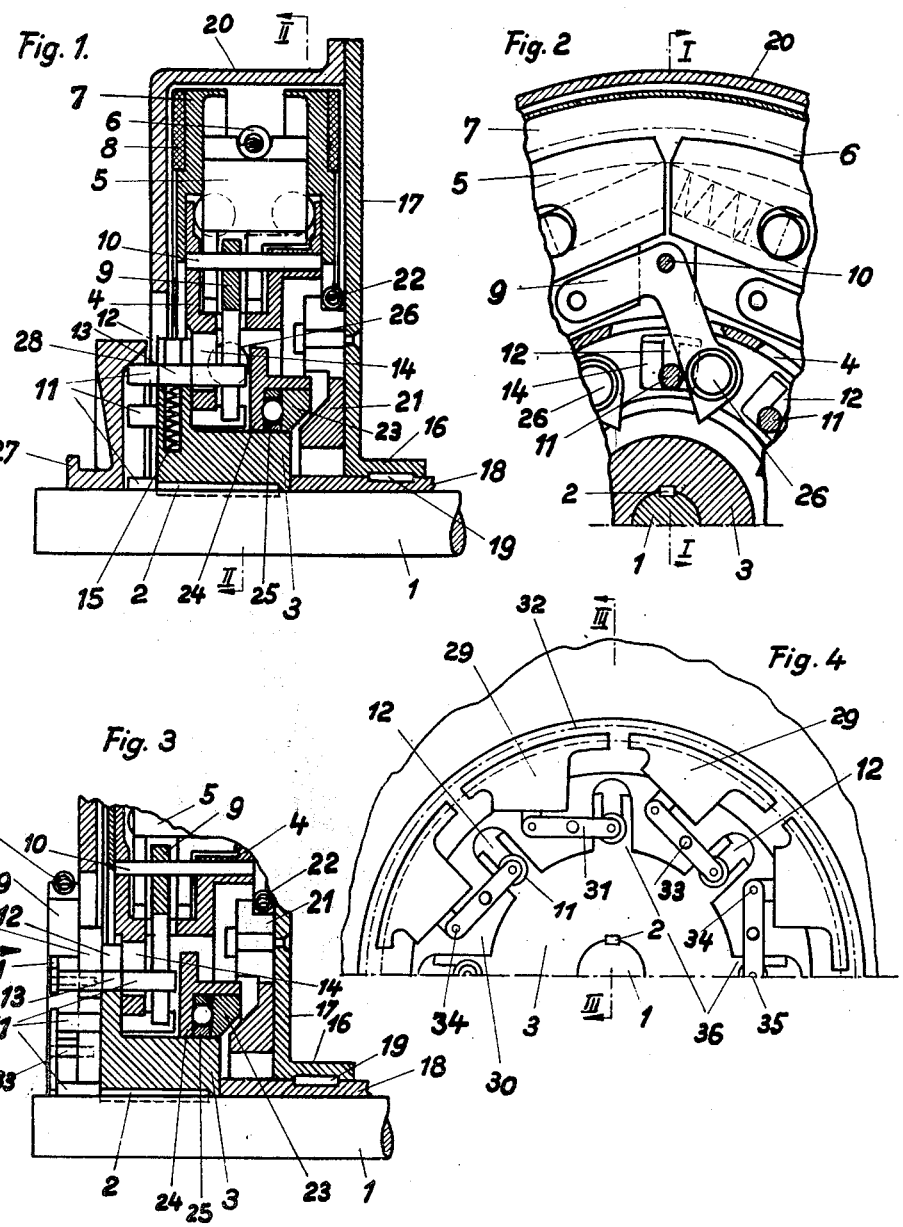

United States Patent Office

2,697,501
Patented Dec. 21, 1954

2,697,501

INFLUENCEABLE CENTRIFUGAL CLUTCH

Fritz Kreis, Wurzburg, Germany

Application December 3, 1951, Serial No. 259,549

3 Claims. (Cl. 192—105)

This invention relates to centrifugal clutch constructions and has for its object to provide an influenceable centrifugal clutch, which is particularly intended for the connection of one stage of a change speed gear with the engine of a motor vehicle, in which the centrifugal weights are pivoted on pivotally supported levers and in which stops are arranged which abut against said levers.

In the known centrifugal clutches of such kind, the disconnecting zone, that is the zone existing between the earliest and the latest disconnecting point, is determined by the diminishing centrifugal force of the centrifugal weights, and the limits of said zone are dependent on the velocity of revolution of the clutch, the lever ratio of the centrifugal weight-levers, and the weight of the centrifugal weights. The highest moment of rotation gives the earliest disconnecting point, and this point will be correspondingly lower when the moment of rotation is varied downward. The transmitting capability of the clutch diminishes with the diminishing revolution and at a certain point no transmission takes place any more. This is the last disconnecting point.

Particularly with high speed vehicles it would be desirable to increase the disconnecting zone. The known constructions do not allow this enlargement. The displacement of the given disconnecting zone would satisfy the above desire, since this displacement would allow the bringing of the given disconnecting zone, at will, at a higher or deeper level, for hill and town runnings, respectively, where the power needs are quite different. The known clutch constructions, however, do not allow such displacement of the disconnecting zone. Hence, the most favourable utilisation of the motor moment is not achieved with such constructions.

With the present invention, the displacement of the disconnecting zone of the clutch is achieved by the fact that the stops which are arranged on the carrying hub, are radially displaceable on said hub. From this arrangement results a high disconnecting point for high speed running and a low disconnecting point for town running with more running in the direct speed and therefore with lower gasoline consumption, less noises, more saving and longer life of the motor.

The desired position of the radially displaceable stops can be regulated by hand. It is however possible to provide for an automatic displacement of said stops by means of centrifugal weights which are independent of the centrifugal weights of the clutch.

The automatic or hand displacement of the stops can be achieved in various manners. In the following description, only one embodiment by way of example of the object of the invention is described, for each of said displacements. In the case of hand influence, the position of the stops, which are under the action of springs, is varied by means of an axially displaceable conical surface. In the case of automatically influenced stops, the stops are connected through levers with their centrifugal weights which are spring actuated, or alternately the levers are acted on by a spring against the action of the centrifugal force.

The above mentioned two embodiments, for hand and automatic displacement, respectively, of the stops, are shown in the annexed drawing, in which:

Figure 1 is a cross-sectional view taken on the line I—I of Figure 2; Figure 2 is a fragmentary enlarged side elevational view taken on line II—II of Figure 1; Figure 3 is a detailed cross-sectional view of the automatically actuated stops and is taken on line III—III of Figure 4, and Figure 4 is an enlarged elevational view of Figure 3 looking in the direction of the arrow in Figure 3.

On the driven shaft 1 is fixed a carrying hub 3 by means of a key 2. This hub, together with the centrifugal weight carrier 4, the centrifugal weights 5, the tie spring 6, the pressure plates 7 with linings 8, and the levers 9, forms the driven part of the clutch. The power transmission between the hub 3 and the levers 9, which are supported by pins 10, is brought about by means of stops 11 which are guided with surfaces 13 in slots 12 of the hub. The centrifugal weight carrier 4 has openings 14 for the free passage of the stops 11 therethrough. The stops 11 are actuated by springs 15.

The driving part of the clutch consists of a disc 17 having a hub 16 which is keyed on the hollow shaft 18 by means of a key 19, a clutch drum 20 fixed to the disc 17, and the resistance centrifugal weights 21 with tie spring 22.

Between the resistance centrifugal weights 21 and the centrifugal weights carrier 4, two ring bodies 23 and 24, having a thrust bearing 25 therebetween, and the pressure balls 26 are arranged.

The clutch according to this invention is adapted for the automatic insertion and disinsertion or engagement and disengagement of the second and higher drive stages of an automatic change speed gear. The movable partst of such clutch are arranged on the driven clutch shaft and are rotating with this shaft.

The working of this clutch (conventional per se) is as follows: When the vehicle has been started with the first drive stage, the shaft 1 is rotating at a rate of speed corresponding to the running of the vehicle in the first drive stage. The driven parts of the clutches of the higher drive stages (which are clutches according to this invention) are therefore rotated at the same rate of speed. As soon as the speed of rotation of the shaft 1 exceeds the best revolution speed of the first drive stage, either for increased running speed of the vehicle or for diminished load moment, the weights 5 of the clutch of the next higher drive stage will swing out and will bring about the clutching with the driving shaft 18, through the pressure plate 7 which linings 8 thereof will be pressed against the inner walls of casing 17–20 that is fixed with said driving shaft 18. Now the power flow is inversed. Initially, it came from shaft 1 to shaft 18, now it comes from shaft 18 to shaft 1 which is now driven with the next higher driving stage. The lower drive stages are overrun by means of a free wheel device as known.

The purpose and operation of the resistance weights 21 is to avoid sliding between the clutch linings. The swinging out movement of the centrifugal weights 5 is opposed by resistance centrifugal weights 21, which swing out earlier than the weights 5. These weights 21, through their conical surfaces, act on the ring system 23, 24 and 25 which becomes axially displaced and in turn displaces axially the balls 26. The balls 26 thus become pressed or moved with part of their periphery forced into holes in the centrifugal weight carrier 4, while the other part of their body is lying in bores provided in the free ends of levers 9. Thus, these levers are hindered in their attempt to swing around their pivots 10 until the centrifugal force of the weights 5 is great enough to push back the balls 26 against the action of the resistance weights 21 and ring system 23, 24 and 25. Thus the engagement or insertion of the clutch is delayed and sliding of the clutch linings is avoided. The working of the improvement according to this invention is as follows: When the clutch is inserted, the centrifugal force of the clutch weights 5 has pushed the resistance weights 21 back to their starting position, through pressure balls 26 and ring bodies 23, 24. The power transmission passes through the levers 9 and stop pins 11 to the carrying hub 3, the shaft 1 and hence to the driven shaft of the vehicle. If now a higher load moment arises on this latter shaft, due either to a hill up running or to a higher speed running of the vehicle, a relative movement of the hub 3 with respect to the centrifugal weight carrier 4 will take place and therefore the centrifugal weights 5 will be pulled back by the pins 11 which are acting on the levers 9 thereby cooperating with the tie spring 6. The clutch becomes disconnected.

The point at which the clutch becomes disconnected is determined by the length of the levers from the abutting point of the pins 11 on said levers up to the pivot point 10 of said levers. Thus, the disconnecting moment determines the disconnecting point, and the latter must be variable to satisfy the requirements of the running conditions.

According to the invention, the disconnecting moment can be varied by displacement of the stop pins 11. To achieve this a sliding device 27 is provided and it is axially displaceable on the shaft 1 and has a conical surface 28 by means of which it acts against the stop pins 11 pushing them radially inwardly against the force of springs 15. Thereby the disconnecting moment is increased. A lower disconnecting moment results when the said sliding device is pulled back, so that the said pins 11 become moved radially outwardly by said springs and the length of the lever arm of levers 9 is reduced. The displacement of the sliding device 27 in both directions can be effected through suitable rods by hand.

The automatic radial displacement of the stop pins 11 can be effected by the centrifugal weights 29, (Fig. 4) which are independent from the clutch weights 5 and the resistance weights 21, and are arranged at the outside of a ring body 30 which is fixed on the hub 3. These weights 29 are guided for radial movement and are acting against the stop pins 11 through levers 31; they are urged inwardly by a tie spring 32. The levers 31 are pivotally supported by pins 33 which are fixed on the ring body 30. One end of the levers 31 is connected, by means of a pin 35, to the stop pins 11. To insure free movability of the stop pins 11, the ring body 30 has openings 36.

What I claim is:

1. In an automatic centrifugal clutch adapted for automatic change speed gears of the type comprising a carrying hub, a driven shaft on which the hub is fixed, a centrifugal weight carrier mounted on said hub and having a limited rotational play with respect to said hub, radially movable centrifugal weights guidingly carried by said carrier, a driving shaft, a casing mounted on the driving shaft, clutch plates acted on by the weights and clutchingly engageable with the casing, interengaging means on said clutch plates and weights for moving the plates into and out of engagement with the casing upon radial outward and inward movement of the weights, the improvement comprising levers which are pivotally supported in said carrier and have one end pivotally connected to said weights and stop pins which are mounted in said hub in a manner to act against the other end of said levers, said stop pins being radially displaceable and means associated with the stop pins for controlling the radial displacement thereof.

2. A combination of claim 1, wherein said last means include an axial displaceable camming member mounted on the driven shaft and engageable with the stop pins.

3. A combination of claim 1, wherein said last means include centrifugal weights, means interposed between said weights and said stop pins and provided to transmit the motion of said weights to said stop pins.

References Cited in the file of this patent

UNITED STATES PATENTS

| Number | Name | Date |
|---|---|---|
| 1,987,833 | Lansing | Jan. 15, 1935 |
| 2,091,919 | Freeborn | Aug. 31, 1937 |
| 2,122,218 | Sneed | June 28, 1938 |
| 2,154,419 | Cotterman | Apr. 18, 1939 |
| 2,235,107 | Kreis | Mar. 18, 1941 |

FOREIGN PATENTS

| Number | Country | Date |
|---|---|---|
| 876,672 | France | Aug. 10, 1942 |